United States Patent [19]

Green, deceased et al.

[11] 4,065,950
[45] Jan. 3, 1978

[54] FORMATION OF ARTICLES

[75] Inventors: Derek Green, deceased, late of Aspatria, England; Muriel Irene Green, executrix, Carlisle, England

[73] Assignee: United Kingdom Atomic Energy Authority, London, England

[21] Appl. No.: 715,498

[22] Filed: Aug. 18, 1976

[30] Foreign Application Priority Data

Sept. 12, 1975 United Kingdom ............... 37673/75

[51] Int. Cl.² ............................................. B21C 33/00
[52] U.S. Cl. ....................................... 72/191; 72/197; 72/255; 72/262
[58] Field of Search ....................... 72/91, 92, 93, 185, 72/190, 191, 196, 197, 262, 184, 255

[56] References Cited

U.S. PATENT DOCUMENTS

| | | | |
|---|---|---|---|
| 409,747 | 8/1889 | Hastings | 72/196 |
| 958,010 | 5/1910 | Richards | 72/91 |
| 3,143,009 | 8/1964 | Pfeiffer | 72/191 |
| 3,466,911 | 9/1969 | Marcovitch | 72/91 |
| 3,685,331 | 8/1972 | Marcovitch | 72/91 |

Primary Examiner—Lowell A. Larson
Attorney, Agent, or Firm—Larson, Taylor and Hinds

[57] ABSTRACT

A process for continuous and repetitive production of discrete articles of a desired cross-section from a deformable material can be effected by introducing the material into a moving passageway, causing the material to be drawn along the passageway by frictional drag, and, by blocking the passageway, compressing the material and causing it to enter into successively presented chambers shaped to produce articles of the desired configuration. Optionally the articles can be ejected from said chambers to enable the latter to be re-used. Apparatus for performing this process is also disclosed.

15 Claims, 5 Drawing Figures

FORMATION OF ARTICLES

BACKGROUND OF THE INVENTION

This invention relates to the continuous and repetitive formation of articles.

British Pat. No. 1,370,894 discloses a process and apparatus for the continuous extrusion of material to provide articles in the form of rod, wire, shaped sections and tubing. The articles produced by the said process and apparatus all have a uniform cross-section, because they are extruded through a die or dies, and are of continuous length so long as feed of material continues.

It is an object of the present invention to provide a process and apparatus for continuously and repetitively producing discrete articles of a desired cross-section which is not necessarily uniform.

SUMMARY OF THE INVENTION

According to the present invention, a process for the continuous and repetitive production of discrete articles of a desired cross-section from a deformable material comprises the steps of introducing the material into a moving and confined passageway, causing the material to be drawn along the passageway by frictional drag of the moving passageway, by blocking said passageway at a position spaced from the position of introduction of the material, compressing said material and causing it to enter into successively presented chambers shaped to produce articles of the desired configuration.

Preferably the said process also includes the additional step of causing said articles when formed to be ejected from said chambers to enable the latter to be re-used.

Apparatus for performing a process for the continuous and repetitive production of discrete articles of a desired cross section from a deformable material may comprise a passageway for receiving the deformable material and defined by a first, rotatable member having a groove providing the floor and both sides of the passageway, and a second, relatively stationary, member projecting into said groove and providing the roof of said passageway, chambers positioned so as to be successively presentable to material drawn along said passageway by frictional drag, and an abutment for blocking said passageway whereby the material is compressed and is caused to enter into said chambers in succession and is formed into articles in said chambers. Means for ejecting the articles from said chambers after formation are preferably provided for enabling the latter to be re-presented for further article formation.

The passageway may have a decreasing cross-sectional area along its effective length, and this may be effected by the varying amount of projection of said second member into the groove of said first member lengthwise of the passageway.

DESCRIPTION OF THE DRAWINGS

Constructional examples embodying the present invention will now be described with reference to the accompanying drawings, wherein:-

DESCRIPTION OF THE PREFERRED EMBODIMENTS

Figure 1:
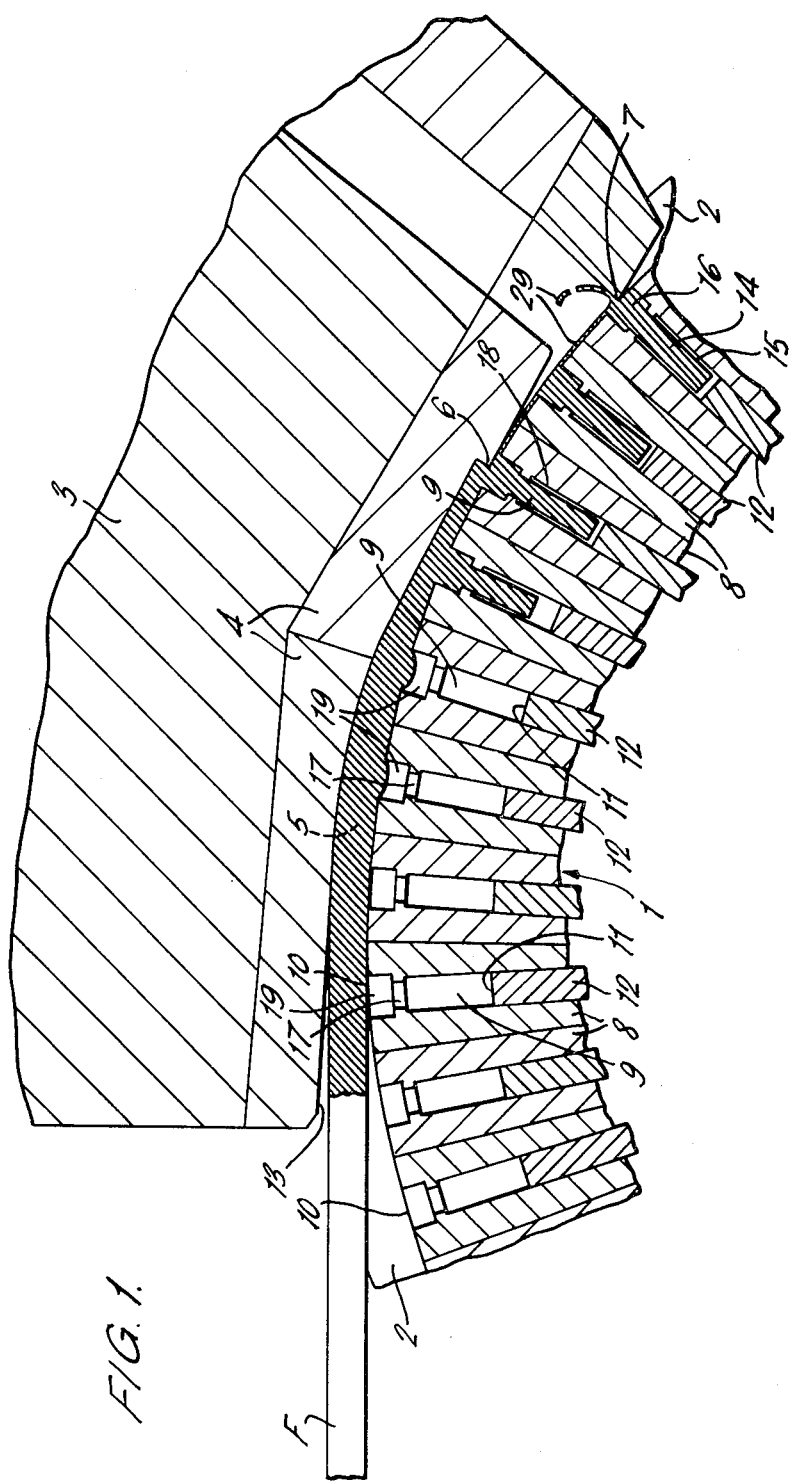
FIG. 1 is a fragmentary side view in section and illustrates a first embodiment.

Referring to the drawings, in which like reference numerals indicate like parts, firstly to FIG. 1, which illustrates a first embodiment of the invention, we provide a continuous extrusion apparatus (the operation of which, subsequently to be described, will make clear the inventive process involved) which has some similarity with the apparatus described and illustrated in our British Pat. Specification No. 1,370,894 in that there is a driven wheel 1 (part only being shown) having an endless groove 2 in the periphery, the groove 2 being engaged by a stationary shoe member 3 having an insert 4 which projects into the groove 2, the shoe member 3 also having an abutment 6 which blocks the whole of the passageway 5 formed by the groove 2 and insert 4. The amount of projection of the insert 4 into the groove 2 varies in a manner such that there is greater projection in the direction of rotation so that the passageway 5 decreases in cross-sectional area in the direction of rotation of the wheel 1. The abutment 6 serves a purpose which will be described hereafter. A further abutment 7 also secured to the shoe member 3 engages the floor of the groove 2 in scraping manner, its purpose also being described hereafter.

The wheel 1 is formed with a succession of abutting members 8 secured together in a manner which provides the wheel periphery or a part of it (widthwise). That is, the members 8 may include the groove 2 or in an alternative the members 8 may form the periphery of a central disc, with a side plate adjacent each side of the central disc to provide the groove sides (not shown). The members 8 also include a plurality of chambers 9, one chamber to each member 8. The chambers 9 are arranged radially with the open end 10 of each chamber 9 opening into the floor of the groove 2, and the closed end 11 of each chamber 9 being provided by one end of an ejection ram or plunger 12 able to move radially outwardly into the respective chamber 9 and to eject a formed article outwardly, the rams 12 being operated at a selected angular region by a cam track, not shown. In each chamber 9 is a die part 17 and adjacent the closed end 11 of the chamber 9 there is a space 18 provided to avoid pressure build-up. The space 19 adjacent the opening of the chamber 9 into the groove 2 provides means for shaping a part of an article 14 to be formed by the apparatus eg a head 16 on a smaller diameter body 15 formed by the die part 17.

In operation, there is fed to the groove 2 in advance of the shoe member 3, as can be seen in FIG. 1, a feedstock F conveniently in the form of a rod of the desired material for forming the articles, examples of suitable material including a metal such as aluminium, and powder or granules capable of compaction and including metal powder, ceramics, and thermoplastics, the shape of the rod where solid or precompacted being circular or rectangular and similar in cross-section to the open groove 2. The insert 4 has a lead-in surface 13 which leads in to the passageway 5 ie to that part of the insert 4 which slopes towards the floor of the groove 2. As the wheel 1 rotates, the feedstock F firstly is confined to fill the passageway 5, then is caused to be compressed (or compacted or further compacted as the case may be, hereafter referred to inclusively as 'compressed') therein and to be gripped by the sides and floor of the groove 2 and therefore to be driven forward as the wheel 1 rotates. As compression continues due to the decreasing cross-sectional area of the passageway 5, the feedstock material is caused by the abutment 6 which closes off the passageway 5 to enter into the chambers 9 as they are successively presented on rotation of the wheel 1. Extrusion through the die parts 17 is also caused, and the parameters are chosen so that extrusion ceases when the material is just clear of the rams 12 closing the chambers 9, as can be seen in FIG. 1. FIG. 1 shows three successive chambers 9 in progressive states of filling, with chambers 9 beyond those three being filled to the desired limit. The abutment 7 scrapes the floor of the groove 2 free of flash (designated 29 in FIG. 1) extruding beneath abutment 6, thereby preparing the groove 2 for fresh feedstock as rotation continues. In a convenient angular region, for example the lowermost region of rotation, the rams are operated to eject the moulded articles into a convenient receptacle. As an alternative to the provision of ejecting rams 12, compressed air may be employed for ejection, not only in the construction of FIG. 1 but in those other constructions described herein in which rams or plungers are referred to.

To assist in reducing the sliding friction between the insert 4 and the feedstock F, which acts against and hence reduces the frictional drag generated between the feedstock and the sides and floor of groove 2, it is preferable to introduce with the feedstock between the latter and the lead-in 13 a thin strip of solid lubricant such as PTFE. It will be found that this does not interfere with moulding and will be removed with the flash 29 by abutment 7.

Figure 2:
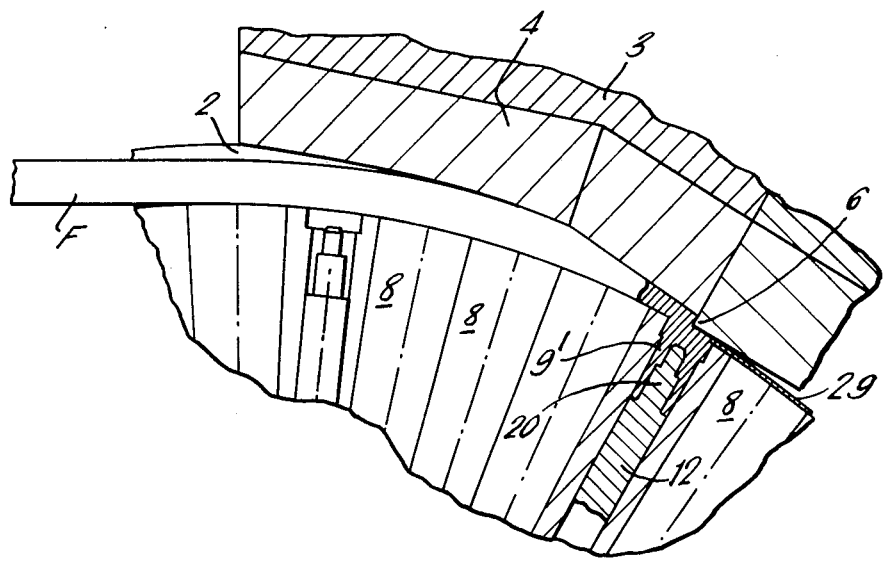
FIG. 2 is a similar view to FIG. 1 and illustrates a modification.

FIG. 2 illustrates how short tubular articles can be produced. The chambers for this (one of which is shown, designated 9') have no die part but have a mandrel 20 forming part of or attached to the respective ram 12, the mandrel 20 illustrated having two diameters, and the chamber 9' likewise having two diameters so that a short, headed, socket-or cap-like article is produced.

Figure 3:
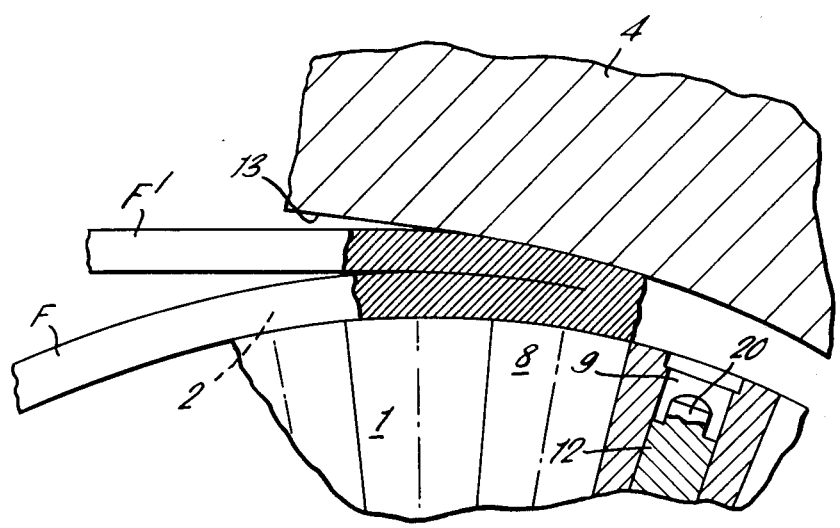
FIG. 3 is a similar view to FIG. 1 and illustrates a second modification.

In FIG. 3, it is illustrated how short, fat articles requiring more material than normal, can be produced. Feedstock F is introduced into groove 2 at an earlier angular position compared with that shown in FIG. 1, and a supplementary feedstock F' of the same material is fed in in similar manner to that shown in FIG. 1, to add to that already in groove 2. The lead-in surface 13 and the slope of insert 4 are suitably dimensioned to permit this.

Figure 4:
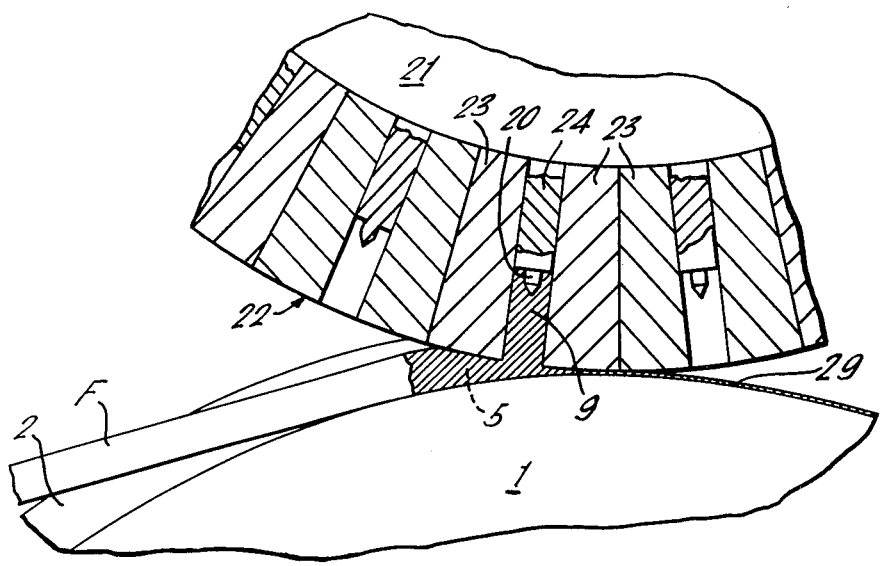
FIG. 4 is a similar view to FIG. 1 and illustrates a second embodiment.

In the embodiment shown in FIG. 4, the apparatus is as shown in FIG. 1 except that, instead of a shoe member 3 and insert 4, another wheel 21 is provided, formed with a periphery 22 which engages the groove 2 in wheel 1 to almost contact the floor thereof. Chambers 9 instead of being formed in wheel 1 are formed in abutting members 23 similar to members 8 in FIG. 1 which together form the periphery 22 of wheel 21, rams or plungers 24 being provided as aforesaid. The wheel 21 not only accepts the material of a feedstock F fed to the groove 2 but also, by virtue of its convergence relative to the floor of groove 2 as the wheels are rotated together, first effects frictional drag and then compresses the material for extrusion into chambers 9, the point of greatest convergence acting as the abutment 6, and the flash 29 passing between the wheels 1, 21 being removed by a scraper, not shown.

In a modification, not shown, the rotating wheel 21 may be employed instead of a shoe member 3, insert 4 and abutment 6 but the chambers are provided in wheel 1 as described with reference to FIG. 1. The wheel 21 may carry in correct angular positions radially projecting tools or shaping expedients to co-operate with the chambers 9. The wheel 21 thus serves not only to generate frictional drag, cause compression and finally effect article formation, but also is capable of carrying out additional forming operations on the articles being shaped in the chambers 9, making possible the production of complex shapes. A development of this concept is that indexing around rather than continuous rotation of wheel 21 can be effected, provided that coincidence of the tools or shapers with the respective chambers 9 is preserved.

Figure 5:
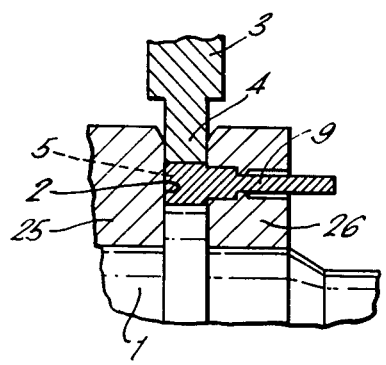
FIG. 5 is a detached fragmentary end view in section and illustrates a third embodiment.

In a further embodiment, illustrated in FIG. 5, the construction is similar to that of FIG. 1 except that, instead of having the chambers in the periphery of wheel 1, the chambers 9 are disposed for sideways extrusion at right angles to the passageway 5 of FIG. 1 in one (as illustrated) side of groove 2, the sides of which are formed by a ring member 25 on wheel 1 and an eccentrically mounted side plate 26 containing the chambers 9, thereby providing for ejection of the formed articles at angular positions clear of the extrusion zone.

I claim:

1. A process for the continuous and repetitive production of discrete articles of a desired cross-section from a deformable material, comprising the steps of
   introducing the material into a moving and confined passageway,
   causing the material to be drawn along the passageway by frictional drag of the moving passageway, and
   by blocking said passageway at a position spaced from the position of introduction of the material, compressing said material and causing it to enter into successively presented chambers shaped to produce articles of the desired configuration.

2. A process according to claim 1, including the additional step of causing said articles when formed to be ejected from said chambers, to enable the latter to be re-used.

3. A process as claimed in claim 1 wherein said successively presented chambers move with said passageway.

4. Apparatus for the continuous and repetitive production of discrete articles of a desired cross-section from a deformable material, such apparatus comprising a passageway for receiving the deformable material and defined by a first, rotatable member having a groove providing the floor and both sides of the passageway, and a second, relatively stationary, member projecting into said groove and providing the roof of the passageway, chambers positioned so as to be successively presentable to material drawn along said passageway by frictional drag, and an abutment for blocking said passageway whereby the material is compressed and is caused to enter into said chambers in succession and is formed into articles in said chambers.

5. Apparatus as claimed in claim 4 wherein said chambers move with said passageway.

6. Apparatus according to claim 4, including the provision of means for ejecting the articles from said chambers after formation.

7. Apparatus according to claim 6, wherein the passageway has a decreasing cross-sectional area along its effective length.

8. Apparatus according to claim 7, wherein the passageway having decreasing cross-sectional area along its effective length is effected by the varying amount of projection of said second member into the groove of said first member lengthwise of the passageway.

9. Apparatus according to claim 6, wherein said chambers are disposed in said first member to extend from the floor of the said passageway.

10. Apparatus according to claim 6, wherein said chambers are disposed in said first member to extend from a side of the said passageway.

11. Apparatus according to claim 10, wherein said chambers are provided in a part of said first member which rotates with said first member but in a manner eccentrically with respect thereto.

12. Apparatus for the continuous and repetitive production of discrete articles of a desired cross-section from a deformable material, such apparatus comprising a passageway for receiving the deformable material and defined by a first, rotatable member having a groove providing the floor and both sides of the passageway, and a second member projecting into said groove and providing the roof of the passageway, said second member being also rotatable in the same plane as said first member but about an axis spaced from the axis of rotation of said first member such that its periphery projects into said groove to form the roof of said passageway and to provide that the passageway has a decreasing cross-sectional area along its effective length, chambers positioned so as to be successively presentable to material drawn along said passageway by frictional drag, and an abutment for blocking said passageway whereby the material is compressed and is caused to enter into said chambers in succession and is formed into articles in said chambers.

13. Apparatus as claimed in claim 12 wherein said chambers move with said passageway.

14. Apparatus according to claim 12, wherein the periphery of said rotatable second member is disposed so as to be just clear of the floor of the groove in the first member and thereby provides and constitutes said abutment in addition.

15. Apparatus according to claim 14, wherein said chambers are disposed in the rotatable second member.

* * * * *